(12) United States Patent
Borchard

(10) Patent No.: US 6,185,919 B1
(45) Date of Patent: Feb. 13, 2001

(54) APPARATUS AND METHOD FOR REMOVING PLANT STALKS FROM A FIELD AND SHREDDING THE PLANT STALKS

(75) Inventor: Milton Anthony Borchard, Woodland, CA (US)

(73) Assignee: Johnson Farm Machinery Co., Inc., Woodland, CA (US)

( * ) Notice: Under 35 U.S.C. 154(b), the term of this patent shall be extended for 0 days.

(21) Appl. No.: 09/358,308

(22) Filed: Jul. 21, 1999

(51) Int. Cl.[7] .................................................. A01D 34/00
(52) U.S. Cl. ..................................... 56/14.5; 241/101.763
(58) Field of Search ............................. 241/101.763, 222, 241/243, 282.1, 242.1; 56/14.3, 14.5, 500, 503, 504, DIG. 4; 171/56, 58, 61

(56) References Cited

U.S. PATENT DOCUMENTS

| | | |
|---|---|---|
| 3,160,214 | 12/1964 | Ruozi . |
| 4,015,667 | 4/1977 | Ruozi . |
| 4,350,207 | 9/1982 | Ben-Dor . |
| 4,751,812 | 6/1988 | Lubetzky et al. . |
| 5,205,496 * | 4/1993 | O'Donnell et al. .................... 241/34 |
| 5,285,854 | 2/1994 | Thacker et al. . |
| 5,330,114 * | 7/1994 | Trenkamp et al. .......... 241/101.763 |
| 5,354,003 | 10/1994 | Stokes . |
| 5,467,828 | 11/1995 | Ruozi . |
| 5,613,566 | 3/1997 | Cox et al. . |
| 5,795,222 * | 8/1998 | McLeod ................................ 460/97 |
| 5,816,036 * | 10/1998 | Caillouet ................................. 56/63 |
| 6,062,009 * | 5/2000 | Caillouet ................................ 56/12.8 |

OTHER PUBLICATIONS

Insterstate Equipment & Manufacturing Corporation of Bakersfield.—No date.
Pixall Corporation of Clearlake, Wisconsin—1992.

* cited by examiner

*Primary Examiner*—Robert E. Pezzuto
(74) *Attorney, Agent, or Firm*—Thomas R. Lampe

(57) ABSTRACT

A system for removing plant stalks from a field and shredding the plant stalks. The plant stalks are cut and passed through feed rollers which directly feed the plant stalk to a shredder. Compression of the plant stalks by the feed rollers increases as the plant stalks slide between the feed rollers in a variable nip formed by the feed rollers.

16 Claims, 10 Drawing Sheets

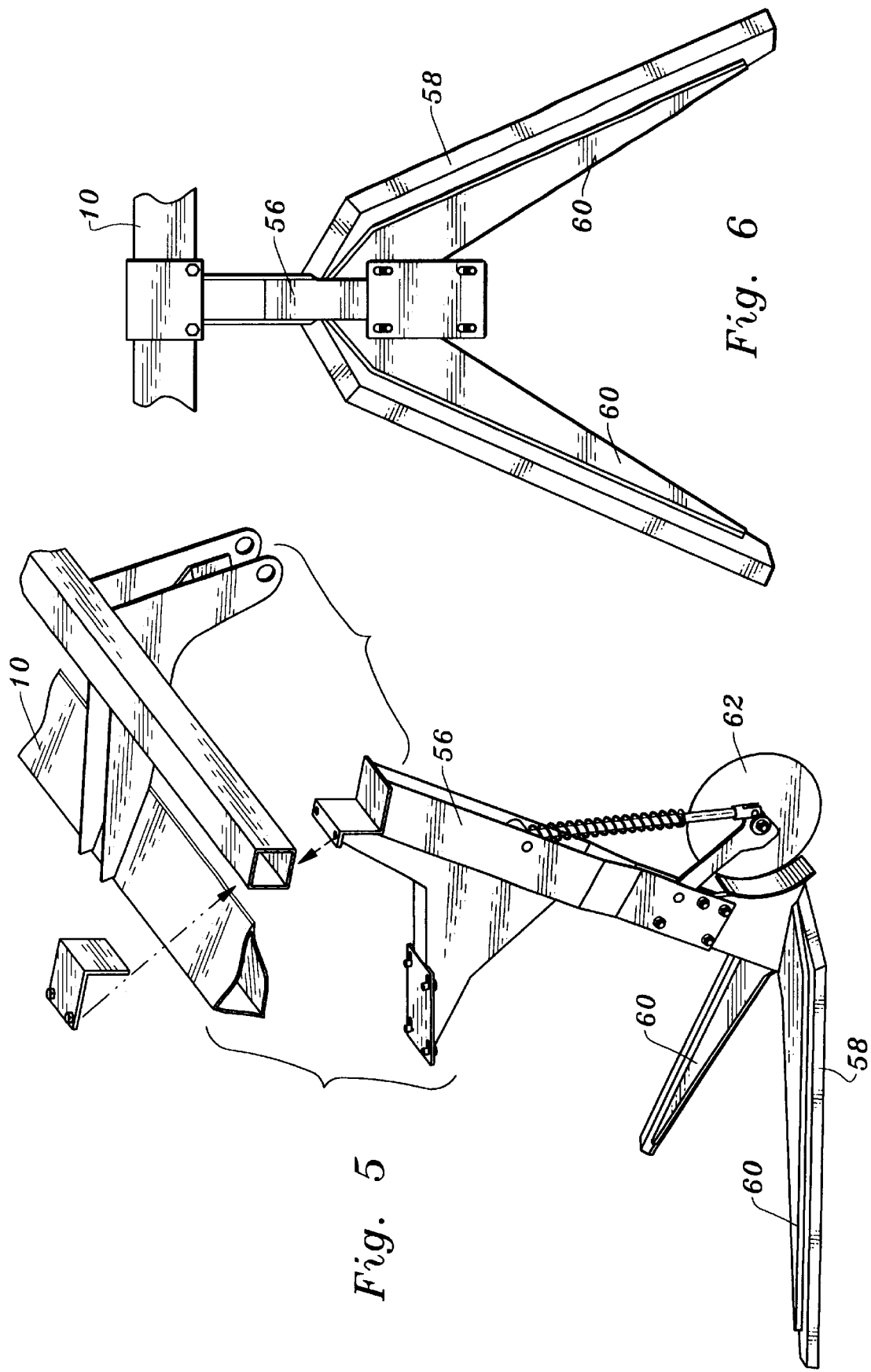

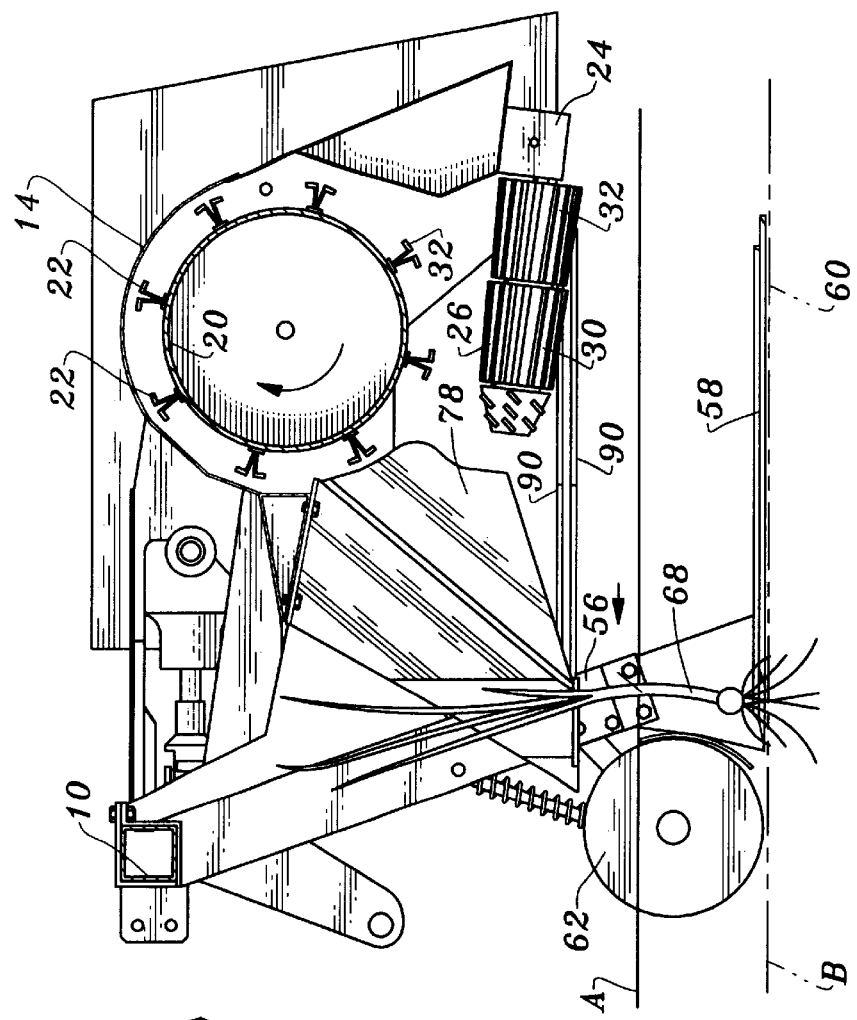
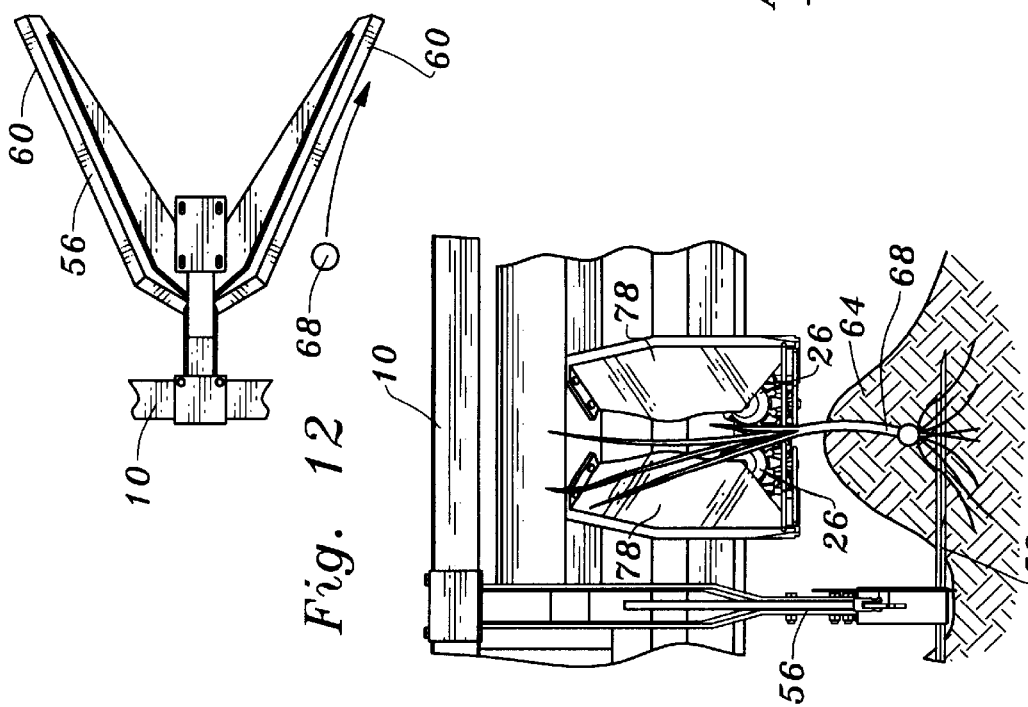

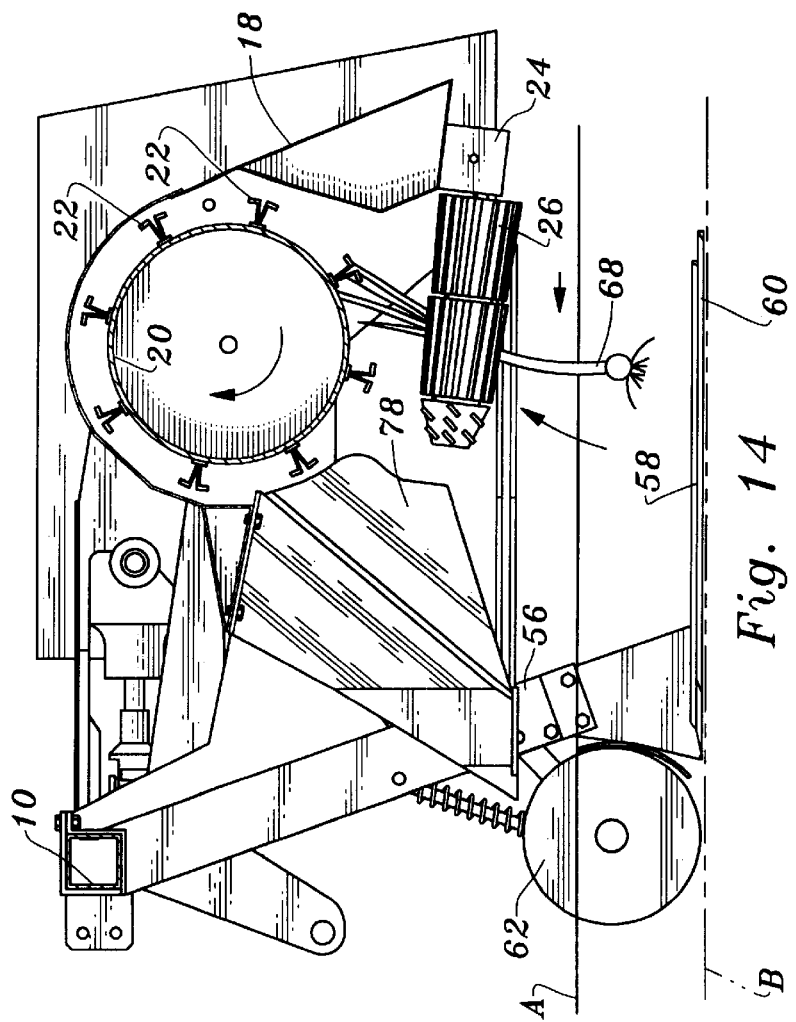
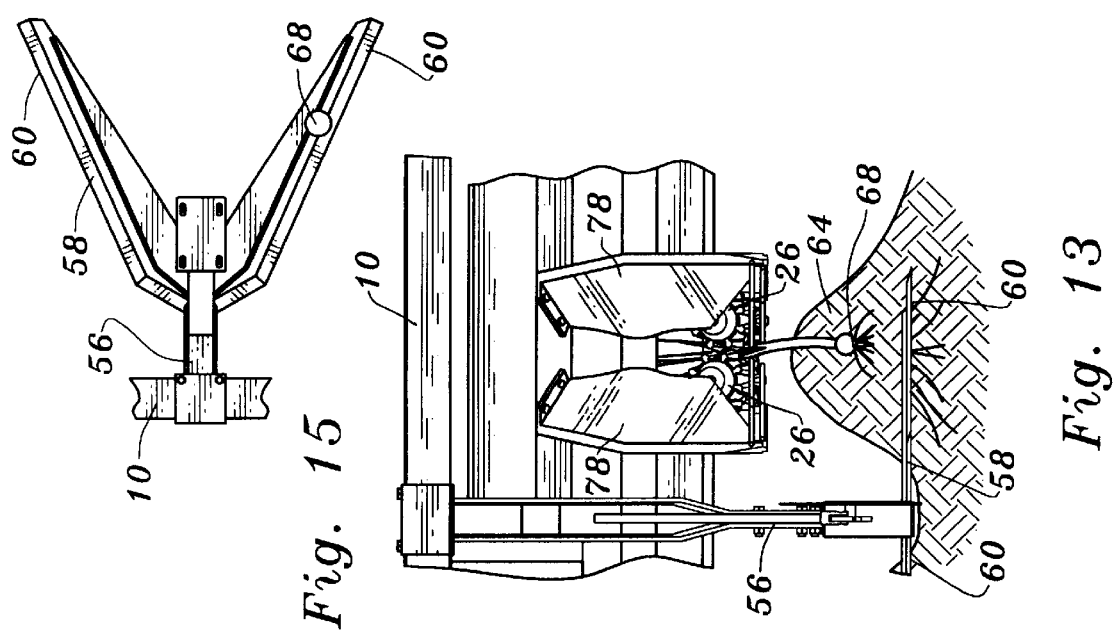

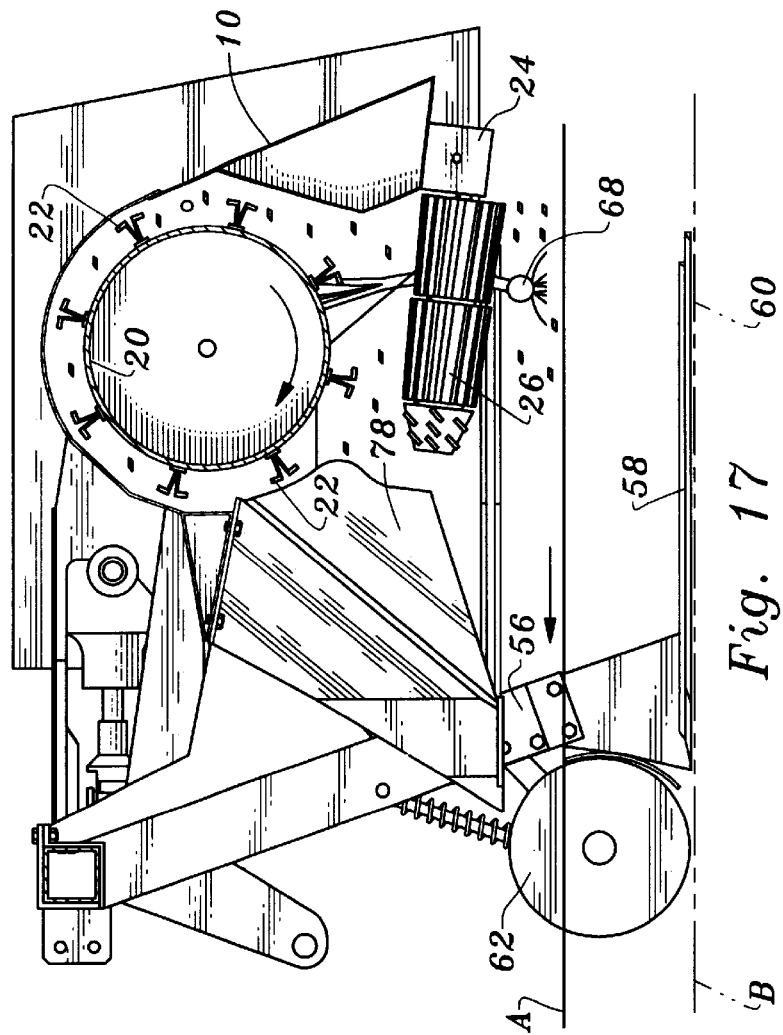
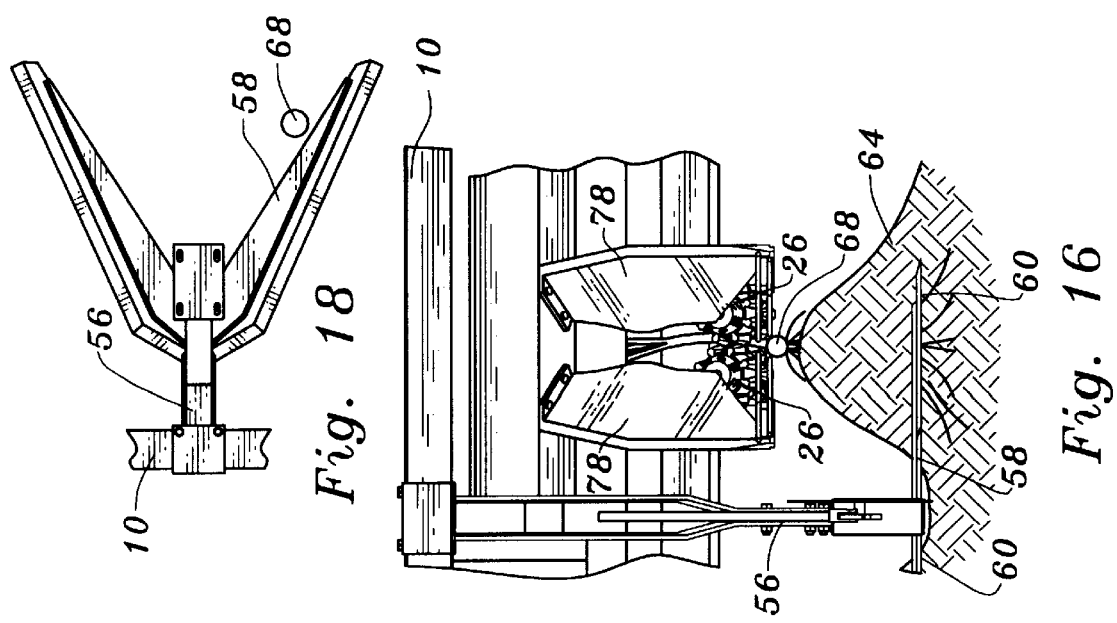
Fig. 17
Fig. 18
Fig. 16

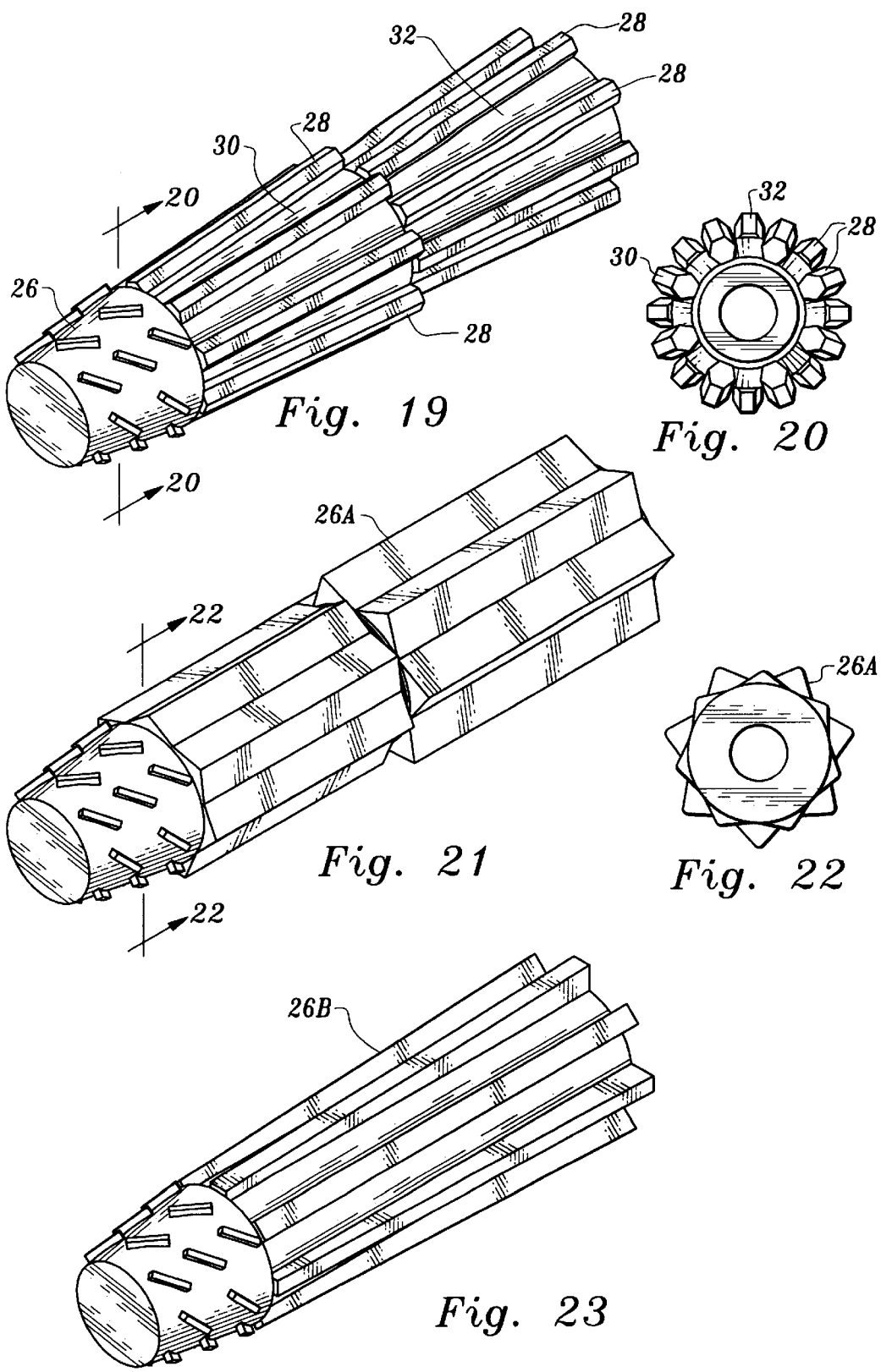

APPARATUS AND METHOD FOR REMOVING PLANT STALKS FROM A FIELD AND SHREDDING THE PLANT STALKS

TECHNICAL FIELD

This invention relates to a system for removing plant stalks from a field and shredding the plant stalks. The invention is applicable, for example, to the stalks of cotton plants.

BACKGROUND OF THE INVENTION

Cotton plants have fibrous, tough stalks which present problems after the cotton plants have been picked. More particularly, if left in the field the stalks can interfere with operation of equipment employed subsequently. Decomposition can in fact take up to a couple of years. The term "stalk" as employed herein includes a stalk per se and also a stalk and associated root structure.

A number of systems have been devised for removing plant stalks from a field and for shredding the plant stalks. Prior art approaches typically provide an arrangement for pulling the stalk out of the ground and then shredding the removed stalk after the stalk has completely left the ground. The following United States patents are believed to be representative of the current state of the art in this field: U.S. Pat. No. 4,751,812, issued Jun. 21, 1988, U.S. Pat. No. 3,160,214, issued Dec. 8, 1964, U.S. Pat. No. 4,350,207, issued Sep. 21, 1982, U.S. Pat. No. 5,467,828, issued Nov. 21, 1995, U.S. Pat. No. 5,285,854, issued Feb. 15, 1994, U.S. Pat. No. 5,613,566, issued Mar. 25, 1997, U.S. Pat. No. 5,354,003, issued Oct. 11, 1994, and U.S. Pat. No. 4,015,667, issued Apr. 5, 1997. Interstate Equipment and Manufacturing Corporation of Bakersfield, Calif. makes available a cotton stalk shredder incorporating structure disclosed in the above-identified U.S. Pat. Nos. 3,160,214 and 4,015,667. Pixall Corporation of Clearlake, Wis. makes available a Pixall sweet corn harvester incorporating a pair of Pixall knife rolls having sharpened chrome-plated blades that intermesh to firmly and positively crimp corn stalks and weeds and pull them down and out of structure at the stripper plates of the harvester.

DISCLOSURE OF INVENTION

The present invention relates to an apparatus and a method for removing plant stalks, such as cotton stalks, from a field and shredding the plant stalks along with any other portions of the plants attached thereto. The apparatus and method of the present invention provide for the ready extraction of the plant stalks from the ground and also for the efficient shredding thereof. Shredding of the stalks commences before they have been fully extracted from the ground. The apparatus works efficiently even in muddy conditions. The apparatus can readily be set up to pull and shred stalks along a plurality of rows simultaneously. The apparatus additionally incorporates structure lessening the chance that stalks will break during the extraction process.

The apparatus of the present invention is for removing plant stalks from a field and shredding the plant stalks. The apparatus includes a frame for transport along a field. Plant cutter means is connected to the frame for positioning underground to cut plants and sever the plant stalks during transport of the frame.

At least one pair of feed rollers is rotatably mounted on the frame, the feed rollers having teeth thereon. The feed rollers define a nip for receiving plant stalks of plants cut by the plant cutter means. The feed rollers compress the plant stalks and pull the plant stalks out of the ground.

Means is also provided for rotating the feed rollers. Plant stalk shredder means is disposed adjacent to the feed rollers for engagement with plant stalks while the plant stalks are passing through the feed rollers and being fed to the plant stalk shredder means by the feed rollers during rotation of the feed rollers.

According to the method of the present invention, a plant is cut underground to sever the plant stalk. The severed plant stalk is directed into a nip defined by two feed rollers. The feed rollers are rotated to apply compressive forces to the severed plant stalk while simultaneously transporting the severed plant stalk to the nip defined by the rotating feed rollers to pull the severed plant stalk from the ground.

While the severed plant stalk is being transported through the nip defined by the rotating feed rollers, the plant stalk is shredded as it exits the nip.

Other features, advantages, and objects of the present invention will become apparent with reference to the following description and accompanying drawings.

BRIEF DESCRIPTION OF DRAWINGS

FIG. 5 is an exploded, rear perspective view illustrating one of the knives employed in the apparatus and a segment of cooperative support structure therefor;

FIG. 6 is a plan view of one of the knives incorporated in the apparatus;

FIG. 10 is a front elevational view illustrating the relationship of a stalk to a knife and to feed rollers just prior to severance of the stalk (including primary root structure) from lower or hair roots thereof;

FIG. 11 is a side view of the apparatus with portions thereof broken away and the root stalk and apparatus structure in the relative positions shown in FIG. 10;

FIG. 12 is a plan view of the knife shown in FIGS. 10 and 11 in relationship to the stalk at the time the stalk and apparatus structure have the relative positions shown in FIGS. 10 and 11;

FIGS. 13, 14 and 15 are views similar to FIGS. 10, 11 and 12, respectively, but showing the stalk having been severed from the lower or hair root structure and in the process of being pulled from the plant bed;

FIGS. 16, 17 and 18 are similar to FIGS. 13, 14 and 15, respectively, but showing the plant stalk including attached root portion extracted from the plant bed and the extracted root portion just prior to passage through a nip defined by feed rollers;

FIG. 19 is a perspective view of a preferred form of feed roller;

FIG. 20 is a view taken along the line 20—20 in FIG. 19;

FIG. 21 is a perspective view of an alternative form of feed roller;

FIG. 22 is a view taken along the line 22—22 of FIG. 21; and

FIG. 23 is a perspective view of yet another form of feed roller.

MODES FOR CARRYING OUT THE INVENTION

Figure 1:
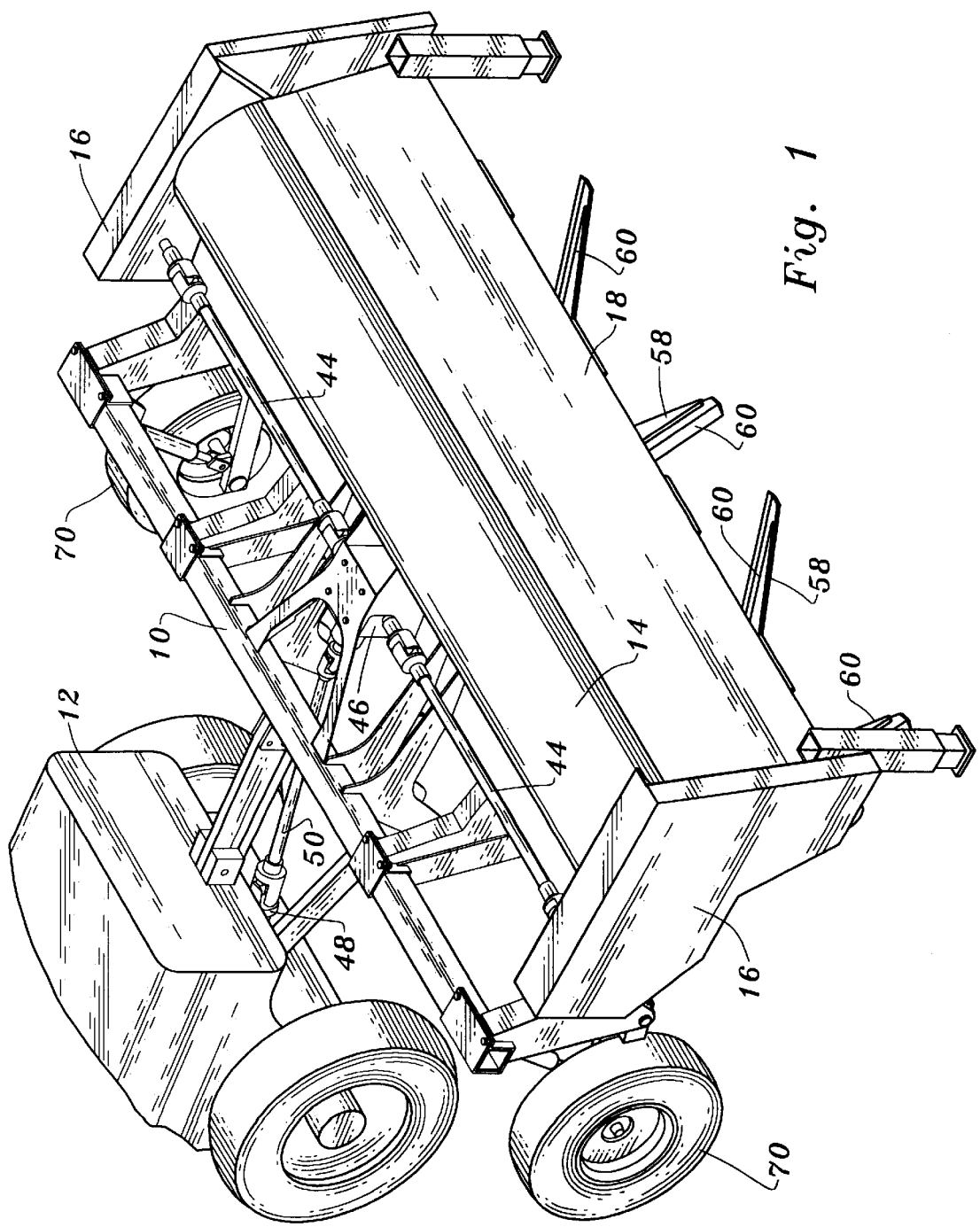
FIG. 1 is a perspective view of apparatus constructed in accordance with the teachings of the present invention being pulled by a tractor and connected thereto through a power take-off arrangement.

Referring now to FIGS. 1–20 of the drawings, apparatus constructed in accordance with the teachings of the present invention is illustrated. The apparatus includes a wheeled frame 10, the frame 10 being pulled by a tractor 12 (FIG. 1). A top cover 14 and end covers 16 are preferably employed to cover some of the operating mechanism of the apparatus. In the interest of clarity one or more of these covers has been removed or is shown broken away in some of the figures of the drawings.

Extending between the sides of the frame 10 and rotatably mounted with respect thereto is a plant stalk shredder in the form of a rotating drum 20. Shredder elements or flails 22 are mounted on the outer periphery of drum 20 at spaced locations thereon. The shredder elements may be of any suitable configuration and structure. They may be fixed in place relative to the drum or may be movably connected to the drum. Shredder elements or flails are known per se. The drum 20 and shredder elements 22 are covered by cover 14.

Gear boxes 24 are mounted at spaced locations on frame 10. Projecting from each gear box is a pair of feed rollers 26 having elongated teeth 28. The feed rollers are rotatable and the elongated teeth 28 are disposed generally parallel to the axes of rotation thereof. The feed rollers 26 have a truncated cone-like configuration with the forward distal ends thereof facing in the direction of transport of frame 10. In the arrangement illustrated, each feed roller has two feed roller segments 30, 32 (see FIG. 4) and the teeth 28 of the feed roller segments of each feed roller are offset with respect to one another. The purpose and function of this offset will be described below.

The feed rollers of each pair of feed rollers define a nip which extends from the stalk entry opening defined by the forward ends of the feed rollers. The nip (identified by reference numeral 34 in FIG. 4) becomes increasingly constricted in a direction opposed to the direction of transport of frame 10; that is, the nip is more restricted at the rear end thereof than at the forward end thereof.

Figure 2:
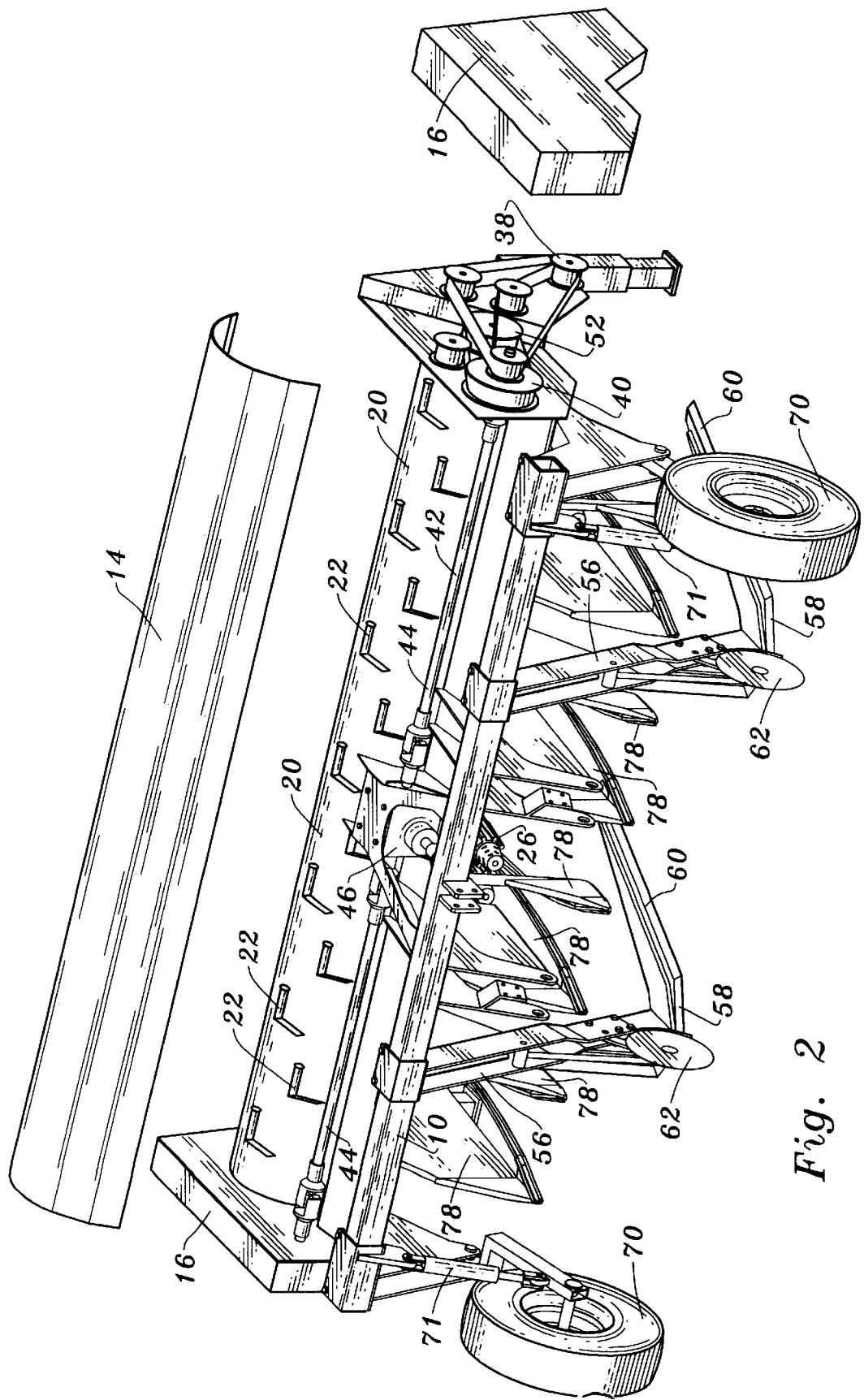
FIG. 2 is a frontal perspective view of the apparatus with portions thereof being broken away to illustrate internal structure of the apparatus.
Figure 3:
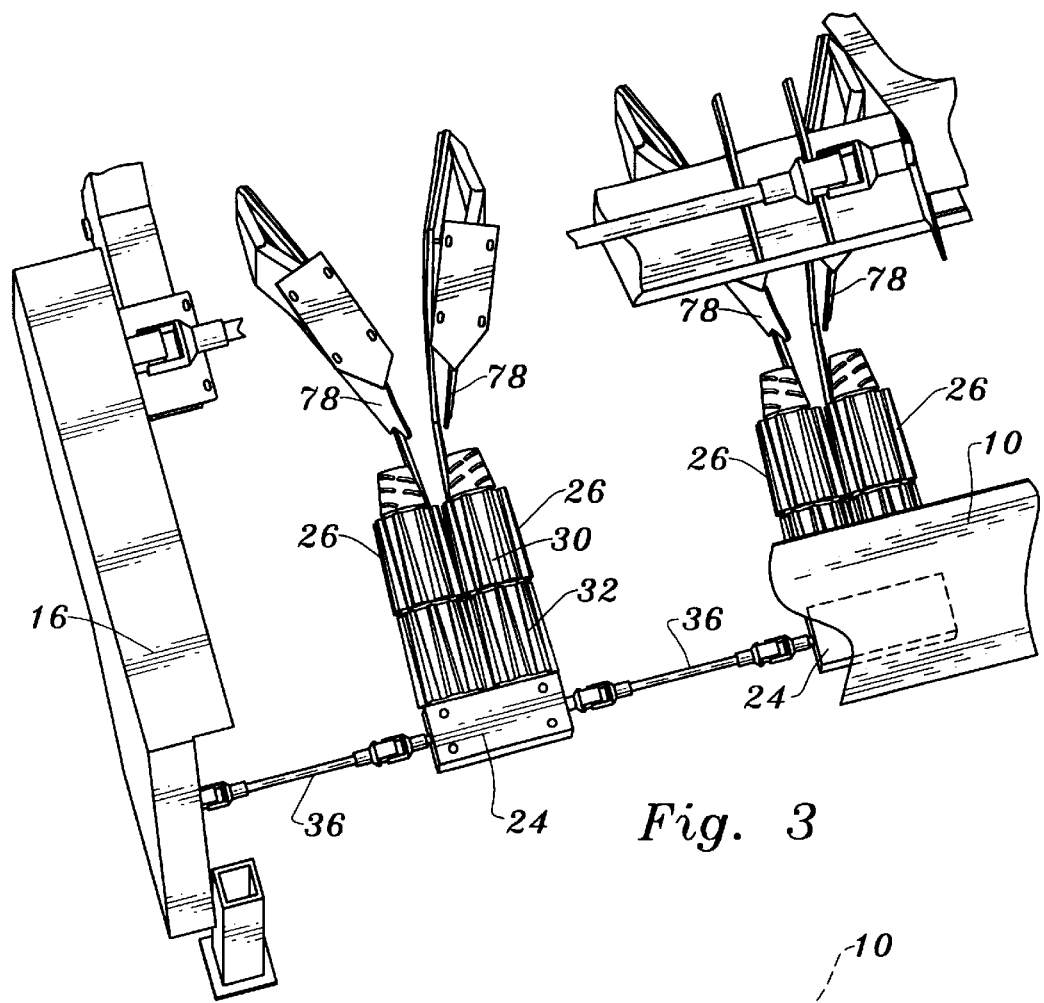
FIG. 3 is a plan view of two pairs of feed rollers and cooperative structure of the apparatus, a portion thereof broken away.
Figure 4:
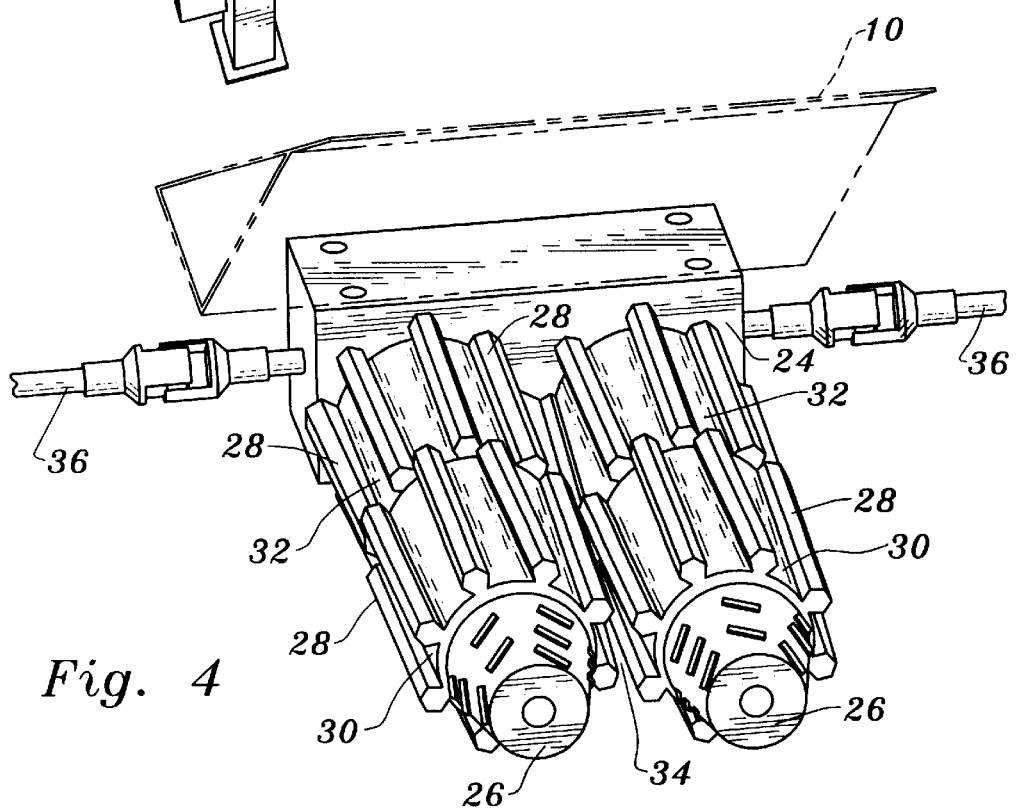
FIG. 4 is a frontal perspective view of a pair of feed rollers employed in the apparatus along with a gear box and associated drive mechanism.

The gearing (not shown) in gear boxes 24 is driven by articulated drive shafts 36. Drive shafts 36 extend between adjacent gear boxes 24 with an outermost drive shaft 36 connected to a drive pulley 38 (FIG. 2). In turn, drive pulley 38 is connected to a master drive pulley 40 by a belt (or chain).

Master drive pulley 40 is attached to the outer end of a rotatable master shaft 42 having two segments 44. The inner ends of segments 44 terminate at a primary gear box 46 which is connected to the power takeoff 48 of tractor 12 by power takeoff drive member 50. Thus, rotation of drive member 50 will cause rotation of the shaft segments 44 of the master shaft 42. In turn, the drive shafts 36 and feed rollers 26 will be rotated.

The direction of rotation of the feed rollers is such that the right feed roller (as viewed in FIG. 4) will rotate in a clockwise direction and the left feed roller will rotate in a counter clockwise direction. The master shaft may be utilized to drive the drive shafts 36 and associated feed rollers from one or both ends of the apparatus, as desired.

The drum 20 is affixed to pulley 52 (FIG. 2) and a belt extending from master drive pulley 40 rotates the drum and associated shredder elements. The axes of rotation of the feed rollers 26 are orthogonal to the axis of rotation of drum 20 and the feed rollers will deliver plant stalks directly to the shredder drum in a manner to be described below.

Attached to frame 10 at the forward or leading end of the frame are knife supports 56 which project downwardly from the frame 10 and support knives 58 at the lower ends thereof. The knives are located in front of and below the level of the feed rollers 26. FIG. 5 may be referred to for details concerning the structure of a representative knife support 56 and the mounting means by which the knife support is affixed to frame 10. Other suitable types of mounting structure and knife support structure may be utilized if desired.

Each knife 58 includes a pair of knife blades 60. The two knife blades of each knife converge away from one another in a direction opposed to the direction of transport of frame 10. The knives have a sharp outer edge. The knife blades of each pair of knife blades of the knife are disposed in front of adjacent pairs of feed rollers 26. That is, each knife is associated with two pairs of rollers. If desired, a rotatable member 62 may be mounted on the knife supports 56 in front of the knives for the purpose of cutting and separating debris in the furrow so that it will not interfere with or prevent the flow of soil around the knife support structure lower end.

Figure 7:
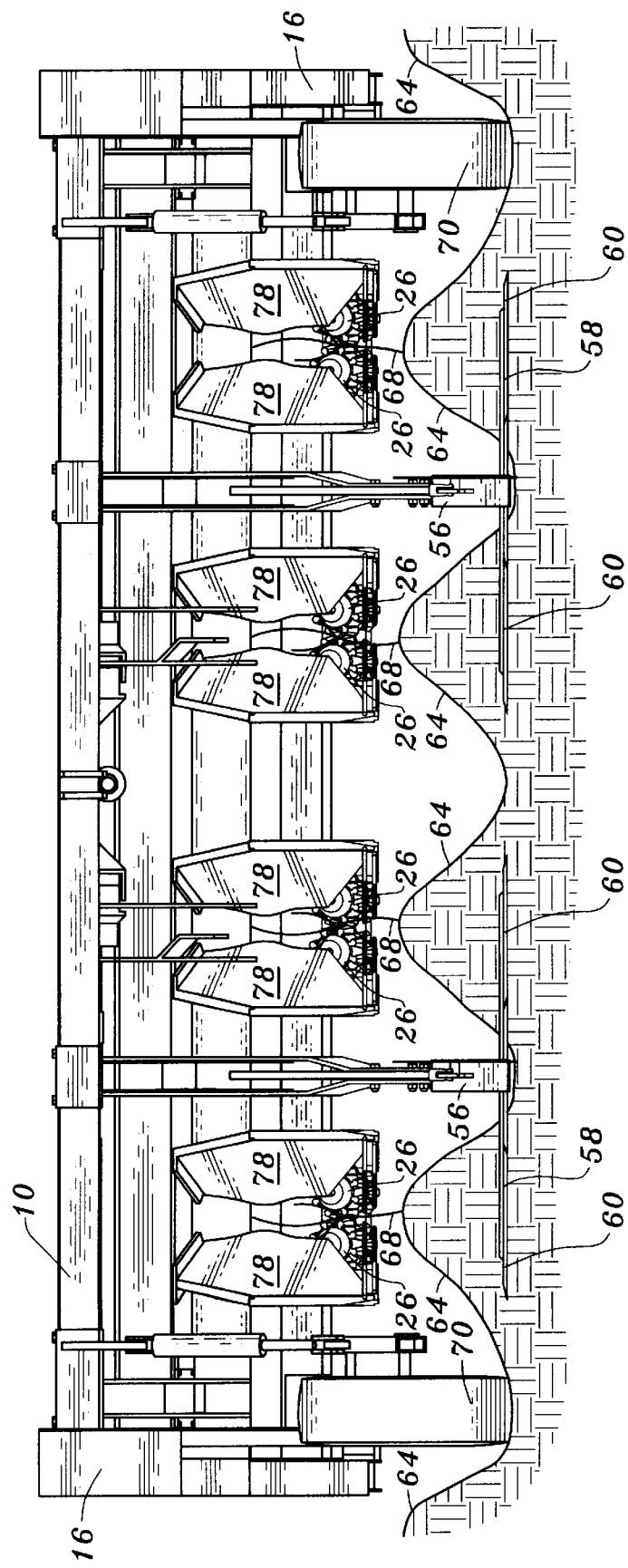
FIG. 7 is a frontal view of the apparatus being employed in a field to extract plant stalks from elongated plant beds.
Figure 8:
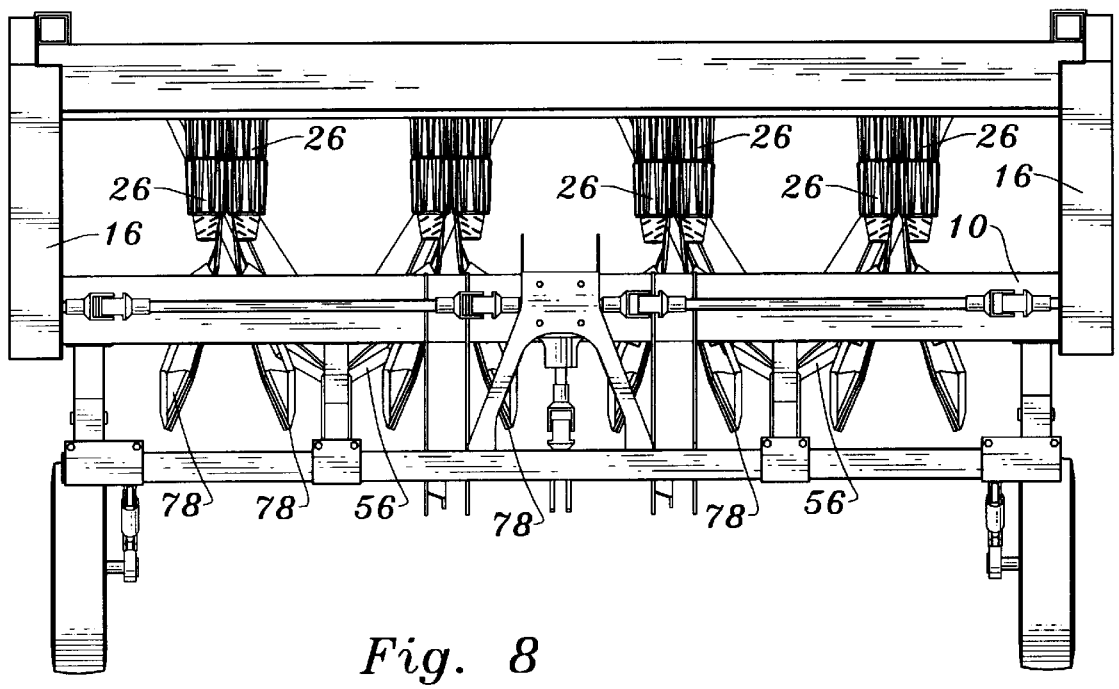
FIG. 8 is a top plan view of the apparatus.

The operation of the apparatus will now be described. FIG. 7 shows a field having a plurality of elongated, parallel plant beds 64. In FIGS. 11, 14 and 17 a line A designates the level of the top of the beds while a line B designates the bottom level of the plant beds. As stated above, the apparatus and method of the present invention are for the purpose of extracting or removing plant stalks from a field and shredding the stalks along with any other parts of the plant attached thereto. The illustrated stalks 68 are cotton plant stalks; however, it is to be understood that the teachings of the present invention can be applied to removal and shredding of stalks of other types of plants. Stalks 68 include not only the stalk per se but also the upper or "meaty" root portion thereof.

Figure 9:
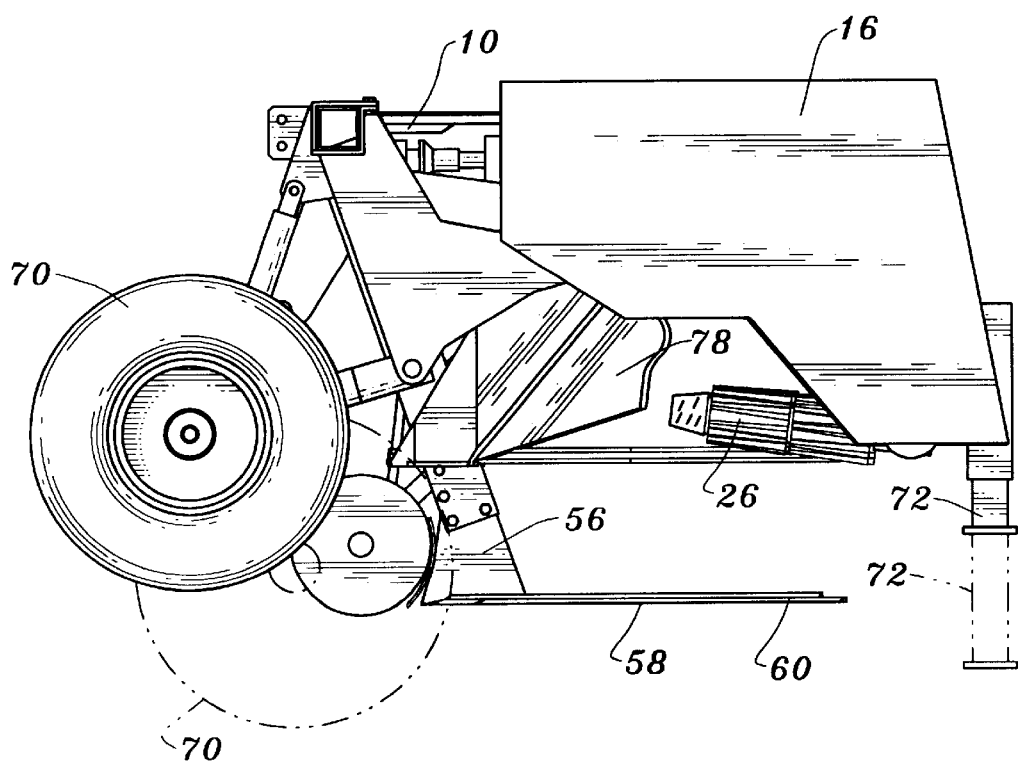
FIG. 9 is a side elevational view of the apparatus and illustrating support structure therefor in two alternate positions, one position being shown in solid lines and the other position being shown in dash lines.

The apparatus and method of the present invention sever the plant at a location underground in the vicinity of the lower or hair root portion of the plant. Wheels 70 are movably connected to the frame and are employed to set the elevation of knives 58 during operation of the apparatus. In FIG. 9, the wheel 70 depicted in solid lines is in a representative raised position and in phantom lines in a representative lowered position. Hydraulic cylinders 71 are associated with the pivoted wheel support structure to raise and lower the wheels. If desired, a jack 72 can be affixed to the frame and moved between a raised position (that showed in solid lines in FIG. 9) and a lowered position (that shown in dash lines in FIG. 9). The jack would of course be raised during operation of the apparatus.

The tractor 12 tows the apparatus in the direction of the horizontal arrow in FIGS. 11, 14 and 17. The wheels 70 are in the furrows between the plant beds as are the knife supports 56. This positions the knives 58 underground in the plant beds at locations wherein the plants in the plant beds are cut or severed in serial fashion by the knives 58. As illustrated, the blades 58 are located by wheels 70 at a level enabling the cotton stalks to be severed between the upper or main part of the root and the lower hair roots. It is not necessary to remove the latter since they cause no impediment to equipment due to their small size and tend to decompose relatively quickly as compared to the rest of the plant.

FIGS. 10, 11 and 12 depict the situation existing just prior to the plant stalk being severed by a knife 58. It will be noted that the upper end of the stalk is positioned between a pair of guide plates 78 which are connected to frame 10 and which converge toward the feed rollers. The guide plates 78 capture the upper part of the plant stalk and guide the upper portion of the stalk into nip 34 of feed rollers 26. Each pair of feed rollers 26 has a pair of guide plates 78 associated therewith.

During transport of the frame 10 the apparatus will be actuated. The tractor power takeoff causes feed rollers 26 and drum 20 to rotate.

After a plant stalk has been severed and then introduced into the nip of the feed rollers, it will slide along the feed rollers in the nip. Because the nip is relatively open at the distal forward ends of the feed rollers a relatively light pulling force will be exerted on the plant stalks initially. This upward pulling force will increase as the nip becomes smaller. Utilizing this approach, assuming that the feed rollers are angled with the lead ends thereof disposed upwardly as shown in the drawings, there is less likelihood of breakage of the plant stalks since the maximum compression and pulling forces exerted by the feed rollers are applied to the lower portions of the stalks, the stalks being progressively weaker as they extend upwardly from tops of the beds 64.

In addition, the wider nip at the forward end of the rollers allows larger stalks to be pulled up without excessive compressive forces being required while smaller stalks are allowed to slide along the rollers in the nip until the width of the nip is sufficiently narrow to allow the rollers to pull them up.

Immediately after upward passage of the plant stalk through the nip it is placed into engagement with the shredder elements 22 of rotating drum 20. This is shown in FIGS. 13, 14 and 15. The shredder elements or flails 22 tend to move the plant stalk relative to the feed rollers and for this reason means is provided to resist sliding of the plant stalk along the feed rollers in the nip at about a mid-way point of the nip. More particularly, the teeth 28 of feed roller segment 32 are offset from the teeth of feed roller segment 30, thus creating an abutment surface (the lead ends of the teeth 28 of the feed roller segment 32) which will temporarily impede sliding passage of the plant stalk along the nip.

As stated above, the greatest compressive and pulling forces exerted on the plant stalk are near the rear or mounted ends of the feed rollers. This is where the stalk is thickest and strongest. FIGS. 16, 17 and 18 show the severed upper portion of the root located just below the feed rollers. Continued rotation of the feed rollers will bring the entire plant stalk into the range of the drum and shredder elements to complete the shredding process. FIG. 17 shows shredded pieces of the plant stalk falling from the vicinity of the drum back to the ground.

There are two guide rods 90 (see FIG. 11) attached to each of the guide plates 78 that guide the portion of the stalk between the top of the bed and the bottom of the rollers. The rods keep the stalks engaged in the nip. Without them the stalks slide along the blades 58 and are not cut until the stalk is pinched off by the rollers, leaving unshredded stalks behind.

FIGS. 21 and 22 illustrate an alternative configuration of feed roller 26A in which the teeth are of a different size and shape than the teeth of the embodiment described above. FIG. 23 illustrates a feed roller 26B having different shaped teeth and incorporating a single roller nip forming segment.

What is claimed is:

1. Apparatus for removing plant stalks from a field and shredding the plant stalks, said apparatus comprising, in combination:

a frame for transport along a field in a direction of transport;

plant cutter means connected to said frame for positioning underground to cut plants and sever the plant stalks during transport of said frame;

at least one pair of feed rollers rotatably mounted on said frame having teeth thereon and defining a nip for receiving plant stalks of plants cut by said plant cutter means, for compressing said plant stalks and for pulling said plant stalks out of the ground, said feed rollers each having a cone-like configuration, a roller end of reduced size, and a feed roller axis of rotation generally oriented in the direction of transport with the roller end thereof facing in the direction of transport, said feed rollers of said at least one pair of feed rollers defining a plant stalk entry opening leading to said nip, said nip being oriented in the direction of transport and being increasingly constricted in a direction opposed to the direction of transport;

means for rotating said feed rollers; and plant stalk shredder means disposed adjacent to said feed rollers for engagement with plant stalks while said plant stalks are passing through said feed rollers and being fed to said plant stalk shredder means by said feed rollers during rotation of said feed rollers, said plant stalk shredder means including at least one rotatable shredder member rotating about an axis, said at least one rotatable shredder member being disposed directly above said feed rollers and engageable with plant stalks while said plant stalks slide through said nip while still in the ground and also while said plant stalks are being fed endwise and upwardly directly to said at least one rotatable shredder member by said feed rollers to shred the plant stalks above the nip.

2. The apparatus according to claim 1 wherein said plant cutter means comprises a knife including a knife blade disposed in front of said feed rollers and below the level of said feed rollers.

3. The apparatus according to claim 2 additionally comprising a rotatable disc mounted in front of said knife to cut debris in front of said knife.

4. The apparatus according to claim 1 wherein said feed rollers are angularly disposed and inclined upwardly in the direction of transport of said frame.

5. The apparatus according to claim 1 wherein the teeth of said feed rollers are elongated and disposed generally parallel to the axes of rotation of said feed rollers.

6. The apparatus according to claim 5 wherein said feed rollers include a plurality of feed roller segments disposed axially along said feed rollers, each of said feed roller segments having teeth, and the teeth of adjacent feed roller segments being offset with respect to one another.

7. The apparatus according to claim 1 additionally comprising guide means for guiding plant stalks to the nip of said feed rollers.

8. The apparatus according to claim 7 wherein said guide means comprises a pair of spaced guide members mounted on said frame and converging toward the feed rollers.

9. The apparatus according to claim 1 wherein said rotatable shredder member comprises a rotatable drum having plant stalk shredder elements mounted on the outer periphery thereof.

10. The apparatus according to claim 1 wherein a plurality of pairs of feed rollers are rotatably mounted on said frame, each pair of said pairs of feed rollers being spaced from one or more adjacent pairs of feed rollers.

11. The apparatus according to claim 10 wherein said plant cutter means comprises a plurality of spaced knives, each of said knives having at least one knife blade disposed in front of and below the level of a pair of feed rollers.

12. The apparatus according to claim 11 wherein at least some of said knives have a pair of knife blades, the knife blades of each said pair of knife blades disposed in front of different pairs of feed rollers.

13. The apparatus according to claim 12 wherein the knife blades of said pairs of knife blades diverge away from one another in a direction opposed to the direction of transport of said frame.

14. A method of removing a plant stalk from a field and shredding the plant stalk, the method comprising the steps of:

cutting a plant underground to sever the plant stalk;

directing the severed plant stalk into a nip defined by two feed rollers rotatable mounted on a frame being transported in a direction of transport, said nip being oriented in the direction of transport and being increasingly constricted in a direction opposed to the direction of transport;

sliding the severed plant stalk between the feed rollers in said nip;

while sliding the severed plant stalk in said nip, rotating said feed rollers about axes of rotation generally oriented in the direction of transport to apply compressive forces to said severed plant stalk in a direction generally at right angles to said direction of transport to pull said severed plant stalk from the ground;

gradually increasing the compressive forces applied to said severed plant stalk by said feed rollers during sliding of the severed stalk between the feed rollers in said nip;

positioning a rotating stalk shredder directly over said rotating feed rollers; and while said severed plant stalk slides in the nip defined by the rotating feed rollers while still in the ground and also while the rotating feed rollers are applying compressive forces thereto to feed the severed plant stalk endwise directly to said rotating stalk shredder, shredding the severed plant stalk above the nip.

15. The method according to claim 14 including the step of engaging the severed plant stalk with an abutment surface while said plant stalk is in said nip to temporarily impede sliding of said severed plant stalk along said feed rollers during rotation of said feed rollers.

16. The method according to claim 14 wherein said cutting step includes moving a knife underground through said plant prior to the application of compressive forces to said plant stalk.

* * * * *